G. A. JOHNSON.
FRICTION GEAR.
APPLICATION FILED DEC. 26, 1916.
1,301,945.
Patented Apr. 29, 1919.
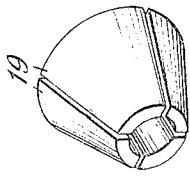
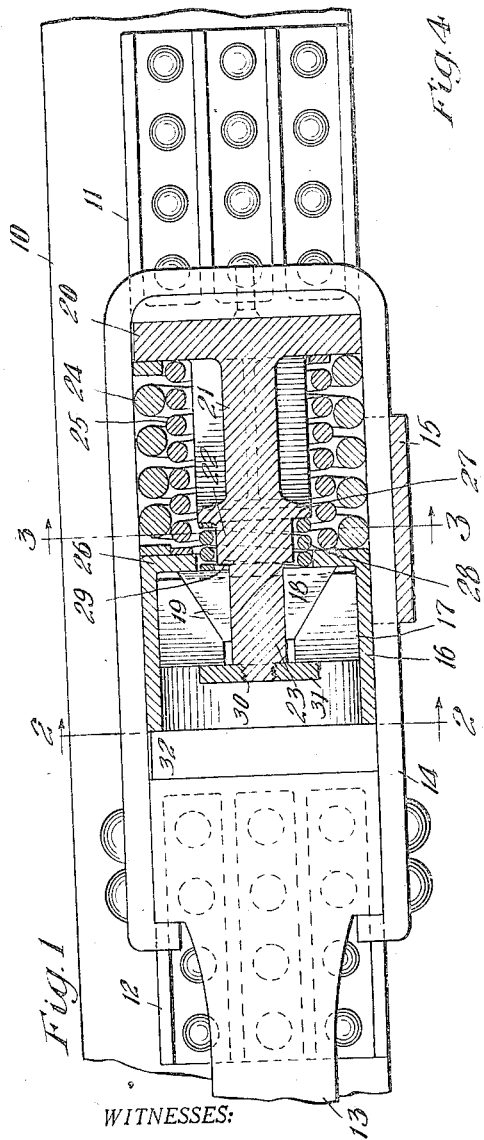
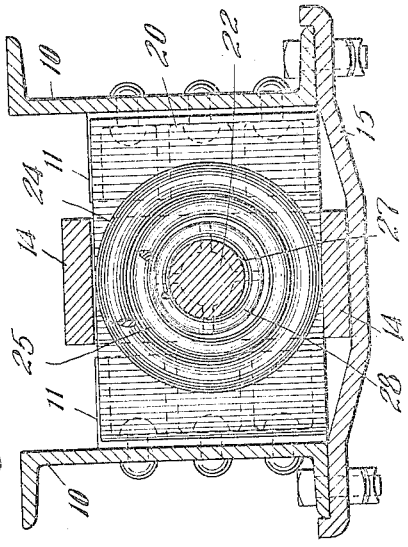
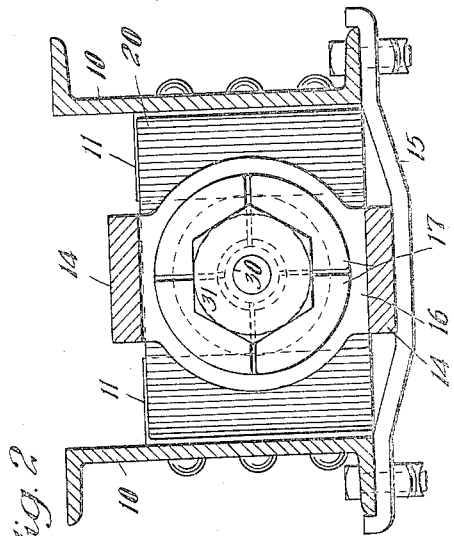
WITNESSES:
Wm. Geiger
Gordie A. Bishop
INVENTOR.
George A. Johnson
BY George L. Haight
His ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

FRICTION-GEAR.

1,301,945.   Specification of Letters Patent.   Patented Apr. 29, 1919.

Application filed December 26, 1916.   Serial No. 138,796.

*To all whom it may concern:*

Be it known that I, GEORGE A. JOHNSON, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

One object of the invention is to provide a friction gear employing a friction shell having coöperating friction shoes and wedge means, and a spring for directly resisting movement of the shell as contra-distinguished from the usual arrangement wherein the spring directly resists the movement of the shoes.

Another object of the invention is to provide a friction gear for railway draft riggings so arranged that a substantially uniform or constant frictional resistance is provided during the compressive action of the gear which frictional resistance is employed in tandem with a spring resistance.

The invention furthermore consists in the improvements in the parts and devices and in the novel combinations of the parts and devices herein shown, described and claimed.

In the drawing forming a part of this specification, Figure 1 is a longitudinal section of a draft rigging showing my improvements in connection therewith, some of the parts being shown in elevation. Figs. 2 and 3 are vertical, transverse sectional views of the structure illustrated in Fig. 1 and taken on the lines 2—2 and 3—3 thereof, respectively. And Fig. 4 is a detail perspective of the set of wedging elements employed in the gear.

In said drawing, 10—10 denote channel shaped center or draft sills of a railway car underframe to which are secured the usual rear stops 11 and front stops 12. The draw bar 13 is operatively connected with the gear, hereinafter described, by means of a yoke 14. The parts are supported in proper position by means of a saddle plate 15 detachably bolted to the flanges of the sills.

The improved friction gear, as shown, comprises a preferably cylindrical friction shell 16 at the forward end of the gear, a series of circularly arranged friction shoes 17 mounted within the shell, a series of wedges 18 mounted within the friction shoes, the shoes and wedges having coöperating wedge faces 19, a rear follower 20 having a forwardly extended post 21, the latter having an intermediate cylindrical portion 22 and a forward cylindrical portion 23 of lesser diameter than the portion 22. Surrounding the post 21 are the two coils 24 and 25 of the spring of the gear, said coils bearing at their rear ends against the follower 20 and at their forward ends against an inturned flange 26 formed on the rear end of the shell 16. A shoulder 27 is formed on the post 21 at the rear end of said intermediate portion 22 and against which bears the rear end of a light spring 28, the forward end of said spring 28 bearing against the rear faces of the wedges 18 and normally holding the latter slightly spaced from the shoulder 29 formed at the junction between the cylindrical portions 22 and 23. The extreme forward end of the post is preferably threaded as indicated at 30 to receive a washer 31, which, in normal position of the parts, engages the forward faces of the friction shoes 17. In said normal position, the rear faces of the wedges 18 also preferably engage the flange 26 formed on the rear end of the shell 16. A front follower 32 is also employed which is interposed between the butt of the draw bar and the front end of the shell 16.

The spring 28 is employed merely for the purpose of maintaining the wedges and friction shoes and shell in proper engagement, that is, to prevent looseness of the parts and the distance shown in the drawing between the shoulder 29 and the rear face of the wedge 18 is exaggerated to more clearly illustrate this feature. In actual practice, said distance will be very slight inasmuch as there is practically no relative movement between the wedges 18 and the shoes 17 during the actuation of the gear.

In operation, upon inward movement of the draw bar, the friction shell 16 will be forced rearwardly and thus compress the main spring of the gear. At the same time, whatever clearance is provided between the wedges 18 and said shoulder 29 will be taken up during the initial portion of the action and thereafter a substantially constant or uniform frictional resistance will be maintained between the friction shoes 17 and the shell 16, the main spring of the gear (coils 24 and 25) being entirely independent of the frictional action thus produced. Upon removal of the pressure, the main spring of the gear will force the friction shell outwardly and thereby restore the normal position of the parts. In draft, the friction shell 16 will remain stationary and the main spring of the gear compressed between the shell and the follower 20. Simultaneously, the friction shoes and wedges on the post 21 will act as a frictional piston coöperating with the shell and the frictional resistance thus obtained will be cumulative with the spring resistance. One of the essential features of the invention is to so arrange the wedges and friction shoes that the main spring of the gear does not act thereagainst and to maintain a substantially constant frictional resistance. The spring 28 will not affect substantially the frictional resistance since the same is merely employed to prevent looseness of the parts, as heretofore described. In this connection, it will be understood that there will be substantially no frictional resistance between the wedges and the section 23 of the post and whatever resistance may possibly be produced between these elements can be considered as negligible since it occurs during an extremely short portion of the initial action of the gear. The washer 31 is provided to insure maintaining the friction shoes and wedges in proper relation, in coöperation with the spring 28.

Although I have herein shown and described what I now consider the preferred embodiment of the invention, the same is merely illustrative and I contemplate all changes and modifications that come within the scope of the claims appended hereto.

I claim:

1. In a friction gear, the combination with a set of friction members capable of relative movement and having a substantially uniform frictional resistance to said movement during the compressive operation of the gear, of spring means co-acting with one of said friction members for restoring the parts to normal condition after said action, said frictional resistance being obtained independently of said spring means.

2. In a friction gear, the combination with a substantially constant resistance friction mechanism, of a spring resistance acting cumulatively with the friction mechanism during the entire operation of the gear, the spring resistance co-acting directly with one of the members of the friction mechanism without affecting the degree of frictional resistance.

3. In a friction gear, the combination with a substantially uniform resistance friction mechanism, of a spring, the resistance of the latter being added to that of the friction mechanism during the compressive action of the gear, said spring acting to restore the friction mechanism to normal condition during release.

4. In a friction gear, the combination with a friction mechanism including a friction shell, friction shoes and wedge associated therewith, of a spring in axial alinement with the friction mechanism and means, upon actuation of the friction mechanism, for compressing the spring in a direction to effect a relative separation between said shoes and the end of the spring adjacent said shoes.

5. In a friction gear, the combination with a friction cylinder, of a follower, a spring interposed between and resisting relative movement between said follower and shell, and a friction piston within the cylinder coöperable with the latter, all parts of said piston being maintained at a substantially relatively fixed distance with respect to said follower at all times.

6. In a friction gear, the combination with a friction shell, of a follower, a post extending from said follower within said shell, wedging means surrounding said post, a plurality of friction shoes mounted within said shell and surrounding said means, the wedging means and shoes being substantially fixed with respect to said post, and a spring interposed between said follower and shell.

7. In a friction gear, the combination with a friction shell, of a plurality of friction shoes mounted within said shell and coöperable therewith, a plurality of wedge elements mounted within said shoes, a follower, a spring interposed between said follower and shell, and means interposed between said wedge elements and the follower for maintaining a substantially fixed distance between said wedge elements and said follower.

8. In a friction gear, the combination with a follower having a post extending therefrom, of a series of wedge elements mounted on said post, a shoulder formed on said post, a light spring extending between said shoulder and said wedge elements, the wedge elements having a limited movement with respect to said post, a plurality of friction shoes disposed around said wedge elements, a friction shell within which said shoes are mounted, and a spring interposed between said follower and said shell.

9. In a friction gear, the combination with a friction shell, of a series of friction shoes mounted within the shell, a plurality of wedge elements coöperable with said shoes and disposed therewithin, a follower having a post extending through said wedge elements and on which the latter are supported, a light spring for maintaining the wedge elements and friction shoes in proper engagement with the shell, and a spring interposed between said shell and said follower for resisting relative movement therebetween.

In witness that I claim the foregoing I have hereunto subscribed my name this 22d day of Dec. 1916.

GEORGE A. JOHNSON.